United States Patent
Chang et al.

(10) Patent No.: US 8,798,171 B2
(45) Date of Patent: Aug. 5, 2014

(54) VIDEO TRANSMISSION BY DECOUPLING COLOR COMPONENTS

(75) Inventors: Chein-I Chang, Ellicott City, MD (US); Han-Jieh Chang, Taipei (TW); Yang-Lang Chang, Taipei (TW)

(73) Assignee: RichWave Technology Corp., NeiHu District, Taipei (TW)

( * ) Notice: Subject to any disclaimer, the term of this patent is extended or adjusted under 35 U.S.C. 154(b) by 644 days.

(21) Appl. No.: 12/824,498

(22) Filed: Jun. 28, 2010

(65) Prior Publication Data

US 2011/0317073 A1    Dec. 29, 2011

(51) Int. Cl.
*H04N 7/12*        (2006.01)
*H04N 11/02*       (2006.01)
*H04N 11/04*       (2006.01)

(52) U.S. Cl.
USPC ............................... 375/240.26; 375/240.28

(58) Field of Classification Search
None
See application file for complete search history.

(56) References Cited

U.S. PATENT DOCUMENTS

| | | | |
|---|---|---|---|
| 4,701,783 A | 10/1987 | Glenn | |
| 6,208,382 B1 | 3/2001 | Glenn | |
| 6,553,153 B1 | 4/2003 | Cui | |
| 6,895,052 B2 | 5/2005 | Hanamura et al. | |
| 7,468,755 B2 | 12/2008 | Ando | |
| 7,499,462 B2 | 3/2009 | MacMullan et al. | |
| 2003/0002582 A1 | 1/2003 | Obrador | |
| 2003/0021485 A1 | 1/2003 | Raveendran et al. | |
| 2004/0213457 A1* | 10/2004 | Mori | 382/167 |
| 2005/0207495 A1* | 9/2005 | Ramasastry et al. | 375/240.16 |
| 2006/0050972 A1 | 3/2006 | Reznic et al. | |
| 2007/0098063 A1 | 5/2007 | Reznic et al. | |
| 2008/0008317 A1 | 1/2008 | Graunke | |
| 2008/0123739 A1 | 5/2008 | Reznic et al. | |
| 2008/0192131 A1* | 8/2008 | Kim et al. | 348/294 |
| 2010/0142812 A1* | 6/2010 | Chen | 382/166 |
| 2011/0064276 A1* | 3/2011 | Tanaka et al. | 382/107 |
| 2011/0273622 A1* | 11/2011 | Ngo et al. | 348/663 |

FOREIGN PATENT DOCUMENTS

CN    86101825 A    11/1986

* cited by examiner

*Primary Examiner* — Joseph Ustaris
*Assistant Examiner* — Kevin McInnish
(74) *Attorney, Agent, or Firm* — Winston Hsu; Scott Margo (57) ABSTRACT

Techniques are provided herein for receiving at a video processing device color video frames comprising grayscale components and color components. The grayscale components corresponding to each of the color video frames are extracted as each of the color video frames is received to obtain grayscale video frames. The grayscale video frames are transmitted at a first transmission rate. Color components for selected color video frames are periodically fused with selected grayscale video frames to obtain fused color video frames, and the fused color video frames are transmitted at a second transmission rate interspersed with the grayscale video frames transmitted at the first transmission rate.

18 Claims, 7 Drawing Sheets

VIDEO TRANSMISSION BY DECOUPLING COLOR COMPONENTS

TECHNICAL FIELD

The present disclosure relates generally to transmitting digital video, and more specifically to designing a reduced bandwidth requirement when transmitting color digital video.

BACKGROUND

Color digital video frames can be represented using a variety of color spaces or color models, e.g., using red, green, and blue (RGB) components; hue, saturation, and intensity (HSI) components; or luminance (Y) and chrominance (UV/CbCr/PbPr) components, and the like. The choice of a color space can be based on design constraints or can be arbitrary as conversion of components between one color space and another is relatively easy to perform. Pixels in color digital video frames are represented by digital values of the components of the corresponding color space. These digital values can be digitally processed before transport to a display device, e.g., quantized or compressed, and then encapsulated in a Motion Picture Experts Group (MPEG) transport stream.

Certain color spaces like YUV and HSI have grayscale components (Y/I) that are represented separately from their color components (UV/HS). Color spaces with separate grayscale and color components can take human perception into account when being digitally processed or sampled. The human brain relies more heavily on grayscale components, or black and white, than color components when an image is viewed on a screen or display device.

SUMMARY

As color video frames are received from, e.g., a camera, the grayscale components are extracted to obtain grayscale video frames. The grayscale video frames are transmitted at a first transmission rate. Color components for selected color video frames are periodically fused with selected grayscale video frames to obtain fused color video frames, and the fused color video frames are transmitted at a second transmission rate interspersed with the grayscale video frames transmitted at the first transmission rate.

BRIEF DESCRIPTION OF THE DRAWINGS

The features and advantages of video transmission by decoupling color components of the present disclosure will become apparent upon consideration of the following description of example embodiments thereof, particularly when taken in conjunction with the accompanying drawings wherein like reference numerals in the various figures are utilized to designate like components.

DESCRIPTION OF EXAMPLE EMBODIMENTS

Overview

Techniques are provided herein for receiving, at a video processing device, color video frames comprising grayscale components and color components. The grayscale components corresponding to each of the color video frames are extracted as each of the color video frames is received to obtain grayscale video frames. The grayscale video frames are transmitted at a first transmission rate. Color components for selected color video frames are periodically fused with selected grayscale video frames to obtain fused color video frames, and the fused color video frames are transmitted at a second transmission rate interspersed with the grayscale video frames transmitted at the first transmission rate.

Example Embodiments

Figure 1:
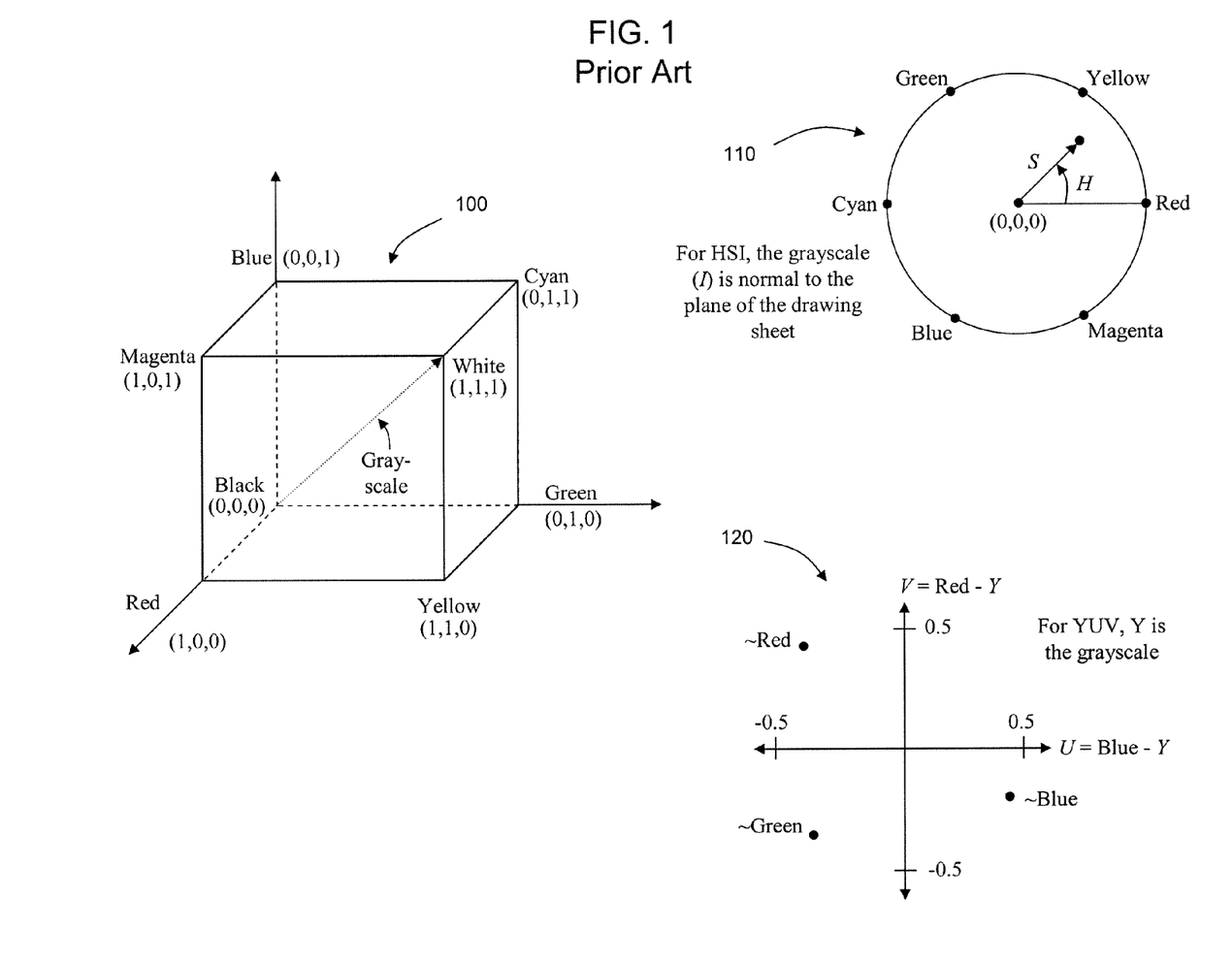
FIG. 1 is a diagram of several example color spaces.

Referring to FIG. 1, a diagram of several example color spaces is shown. At 100, an RGB color cube is shown. RGB is an additive color model in which the three primary colors of light (red, green, and blue) are added together in various ways to achieve a broad array of colors. RGB is used in a variety of applications but is most commonly associated with color televisions and computer monitors. The color cube 100 is scaled or normalized from zero to one such that red is represented by (1, 0, 0), green is represented by (0, 1, 0), and blue is represented by (0, 0, 1). Black is at the origin (0, 0, 0) and white is at a maximum (1, 1, 1). A grayscale is drawn from black to white as a finely dashed line.

When represented digitally, each of the RGB components is given a number of bits for representing the scale from zero to one. For example, if eight bits (an unsigned byte) are used then each color component can range from zero to 255 ($2^8-1$), i.e., 256 discrete steps to represent the range from zero to one. When combined, the eight bits for red, green, and blue, yield a total of 16,777,216 possible digital colors ($256^3$). To represent one-half or 0.5 using eight bits, the maximum value 255 is multiplied by 0.5 to yield approximately 127. If 16 bits are used for each color component then each color component can range from zero to 65535 ($2^{16}-1$). The grayscale for RGB is computed based on human perception and is a weighted average of the RGB components. Typically, 30% of red, 59% of green, and 11% of blue are used to compute the grayscale. It should be understood that various scaling factors and other correction factors, e.g., gamma γ correction, can be used when processing the various components.

At 110, a planar HSI circle is depicted. In this depiction hue (H) or dominant wavelength is a rotation about the circle from red, and saturation (S) or colorfulness is the distance from the origin (0, 0, 0). Intensity or brightness (I) or brightness is perpendicular to the plane of the drawing sheet. All three components form an imaginary color cylinder. Note that dominant wavelength, colorfulness, and brightness are terms in the art of colorimetry or color theory, and are not necessarily equivalent to hue, saturation, and intensity, respectively. The values for hue, saturation, and intensity can be represented digitally as described previously in connection with RGB cube 100.

At 120, a YUV color plane is depicted. YUV was developed during the advent of color television. Since black and white television programming was already in use, color (U and V components) was added to the black and white signal Y (technically gamma corrected Y or luma Y'). U and V are color difference signals with U equal to the blue component minus Y, and V equal to the red component minus Y. Green can be computed using a combination of Y, U, and V.

Figure 2:
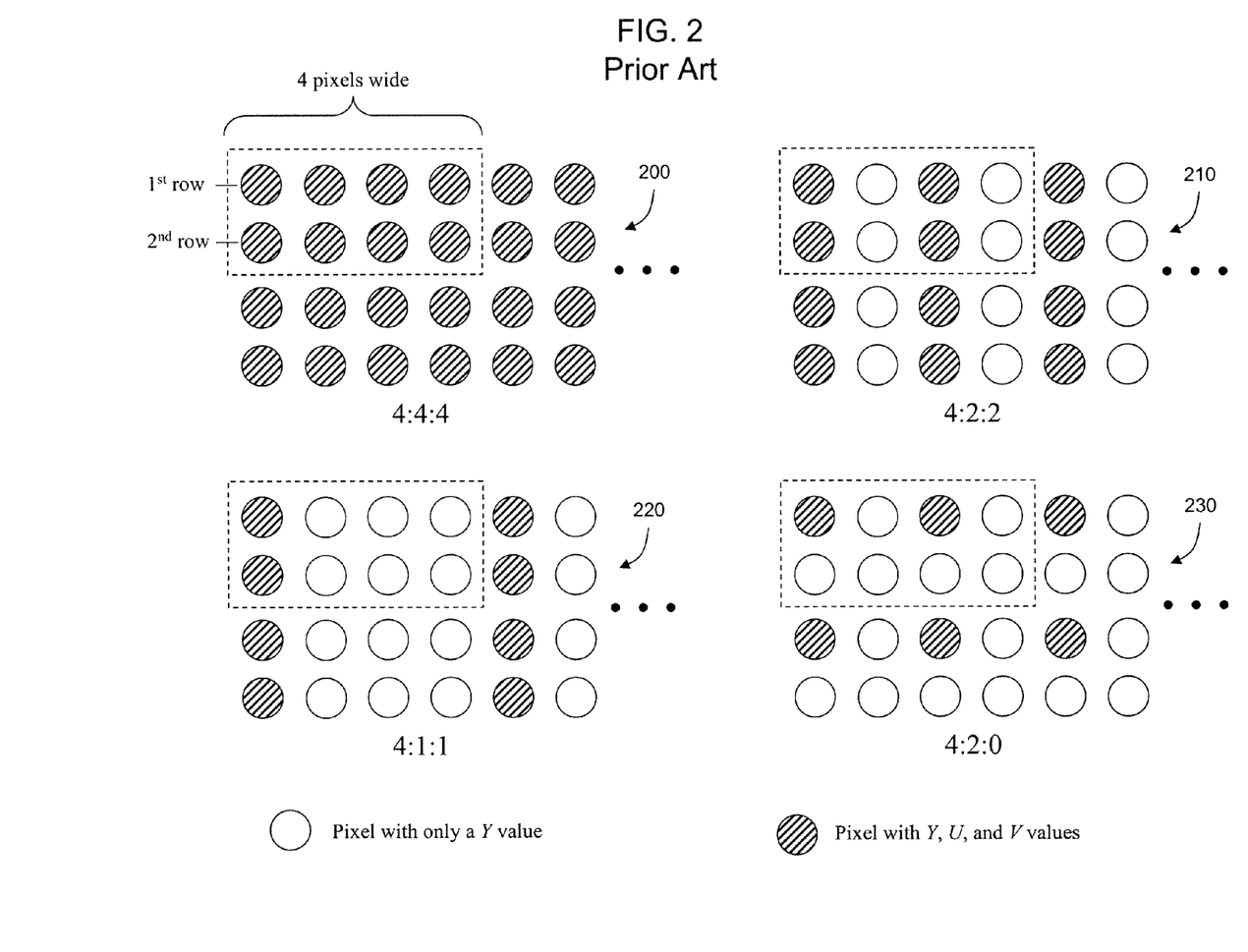
FIG. 2 is a diagram illustrating various YUV color sampling ratios used when processing video frames.

Referring to FIG. 2, a diagram is shown that illustrates various YUV color sampling ratios used when processing video frames. The ratios are usually in the form of an L:M:N ratio and are always understood to refer to an L×2 pixel block (L horizontal pixels by two rows). L is usually an even binary multiple, i.e., 2, 4, 8, 16, etc., but may be any integer. M is the number of UV samples in the first row and N is the number of UV samples in the second row of the L×2 pixel block. Every pixel has a Y component since the number UV samples per row is a ratio of Y, i.e., L is the number of Y samples or pixels. In FIG. 2, pixels are represented by circles. Empty circles represent pixels with only a Y value and hatched circles represent pixels with Y, U, and V values.

At 200, pixels are shown for a portion of a frame with a color sampling ratio of 4:4:4 (L=4, M=4, & N=4). To clarify the illustration, the first 4×2 (L=4) pixel block of each color sampling ratio is highlighted with a dashed rectangle. The 4×2 pixel blocks are understood to repeat throughout the frame. In the 4:4:4 color sampling scheme, four pixels on the first row have U and V samples (M=4) and four pixels on the second row have UV samples (N=4). At 210, pixels are shown for a portion of a frame with a color sampling ratio of 4:2:2 (L=4, M=2, & N=2). In the 4:2:2 color sampling scheme, two pixels on the first row have UV samples and two pixels on the second row have UV samples as shown. At 220, pixels are shown for a portion of a frame with a color sampling ratio of 4:1:1, i.e., one UV sample per row. At 230, pixels are shown for a portion of a frame with a color sampling ratio of 4:2:0. In the 4:2:0 color sampling scheme, two pixels on the first row have UV samples and zero pixels on the second row have UV samples as shown. In some 4:2:0 color sampling schemes the UV values are an average of the UV values for pixels from both rows. Although FIG. 2 has been described with respect to YUV color sampling, it is understood that the color sampling ratios apply to other color spaces as well, e.g., HSI.

Figure 3:
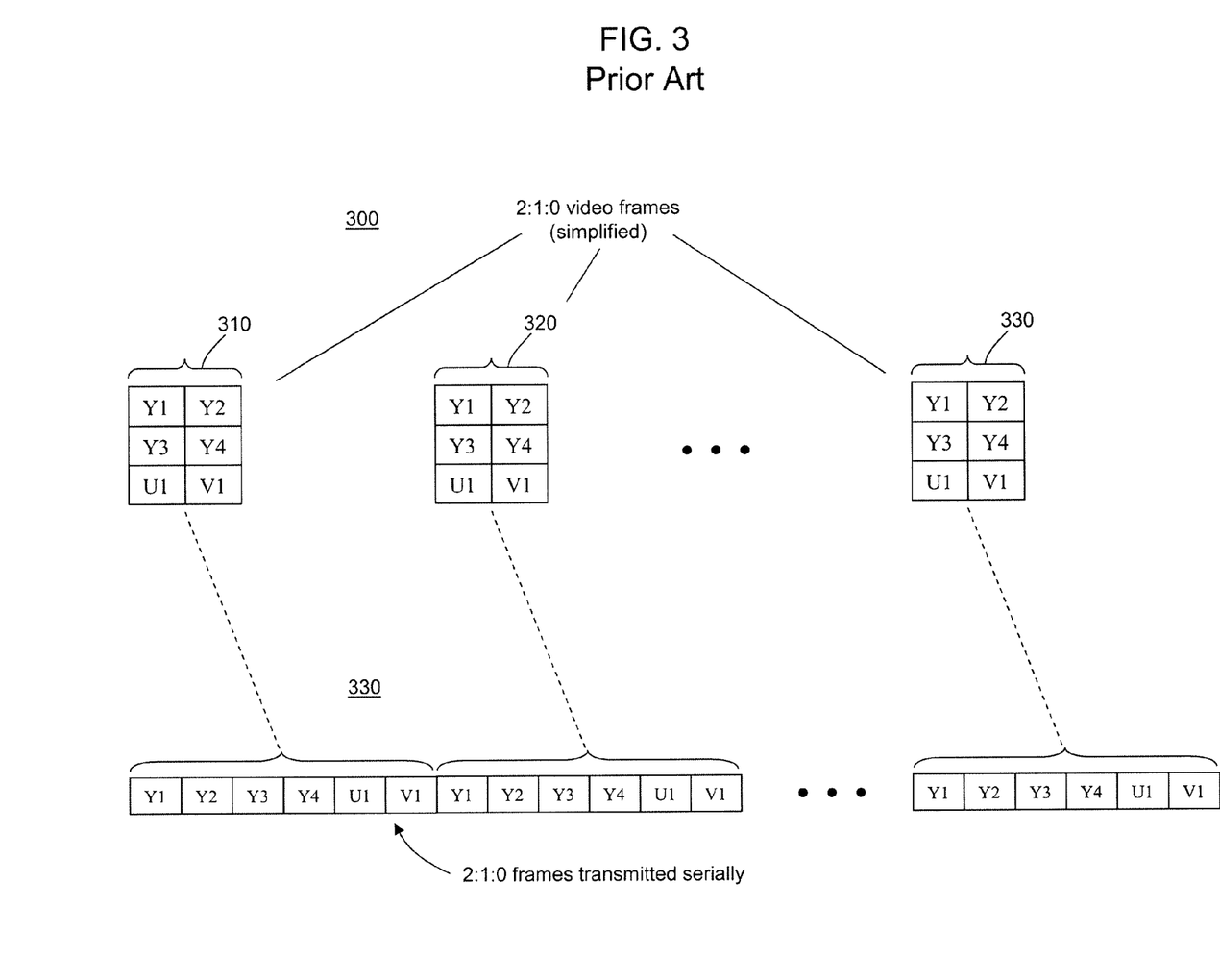
FIG. 3 is a diagram illustrating simplified video frames with a color sampling ratio of 2:1:0 and serial transmission thereof.

Turning now to FIG. 3, at 300, a series of simplified video frames 310-330 with a color sampling ratio of 2:1:0 is shown. At 310, for ease of illustration a representative depiction of a 2:1:0 frame is shown in its simplest form. The frame has four pixels (Y values) indicated at Y1 through Y4, and one UV color sample indicated at U1 and V1. Although only a sample 2×2 pixel block is shown, it should be understood that this sample may represent video macroblocks of various sizes, e.g., 4×4, 8×8, 8×16, and so on, or the sample may represent an entire video frame. At 330, the simplified video frames 310-330 are shown as they might be transmitted in a color image pipeline. In this example the Y components are transmitted first, followed by the UV color components. In other examples, the UV components are transmitted first followed by the Y components, or the Y and UV components may be interlaced, compressed, and/or error corrected.

Figure 4:
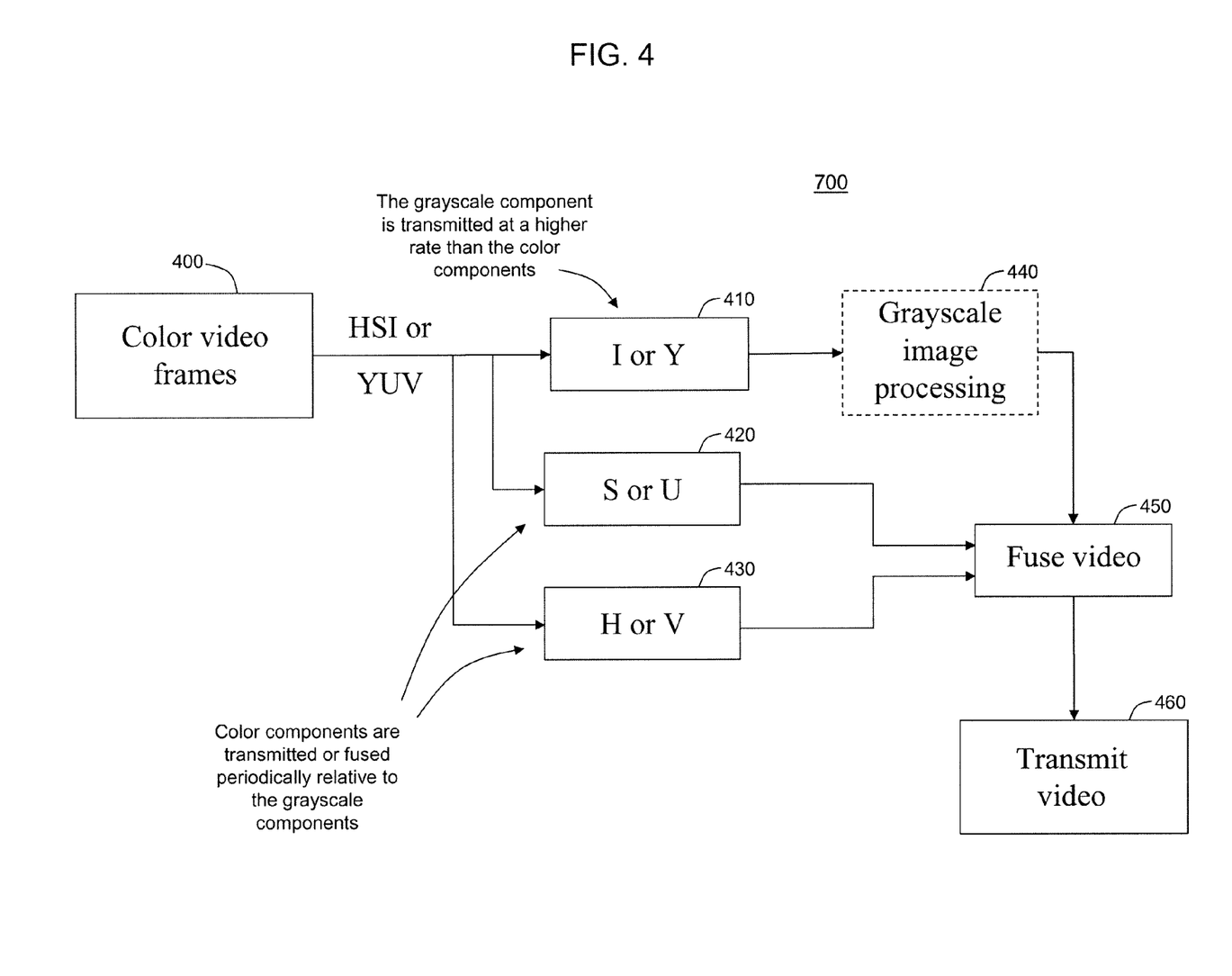
FIG. 4 is a block diagram illustrating one example of how to separately process grayscale and color components using a color decoupling process in accordance with an embodiment of the present invention.

Referring to FIG. 4, a block diagram illustrating one example of a video transmission by color decoupling process 700 is shown. The process 700 is described in general in conjunction with FIGS. 4, 5, and 6, and in greater detail in conjunction with FIG. 7. Briefly, the process 700 separately processes grayscale and color components for color video frames, and periodically fuses the color components back into the image pipeline. Unused color information may be discarded. At 400, color video frames having grayscale and color components are received at a video processing device. The grayscale components 410 are separated or extracted from color components 420 and 430 as the video frames are received. At 440, the grayscale components are optionally processed using image processing techniques, e.g., quantization or quad-tree pyramiding, in order to reduce the amount of grayscale data required for transmitting the video frames to a display.

At 450, color components 420 and 430 are periodically or selectively fused with the processed grayscale frames. The periodicity or rate at which the color components are fused may be varied and based on predetermined criteria, or the rate may be fixed, e.g., every other frame, every fifth frame, every tenth frame, etc. The fusing process will be described in detail in connection with FIG. 7. Briefly, in the fusing process, color components for selected video frames are periodically fused back with corresponding grayscale components, i.e., the selected color components correspond temporally with the grayscale components that they are fused with. At 460, the fused video is transmitted to a display device.

Figure 5:
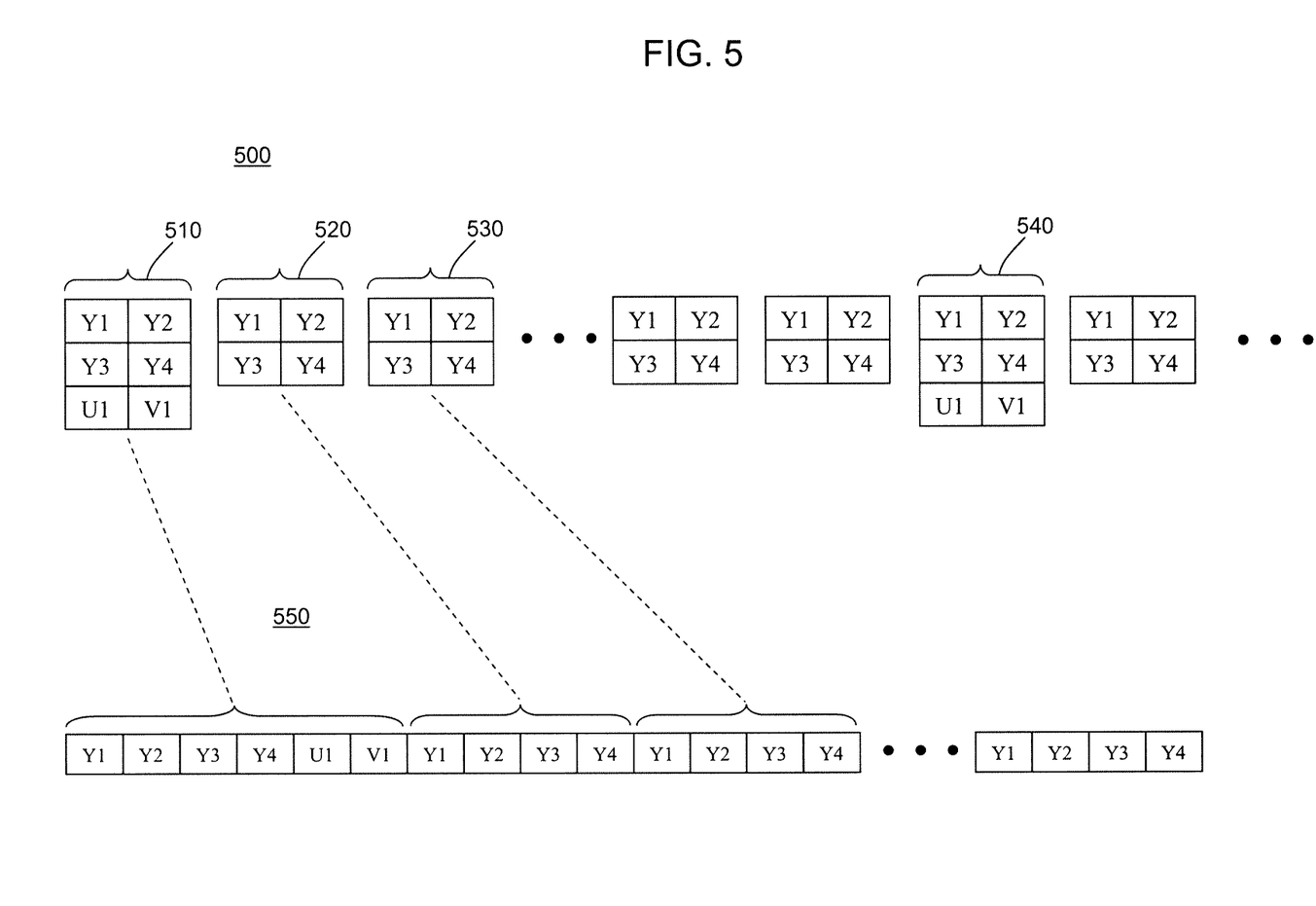
FIG. 5 is a diagram illustrating video frames with decoupled color components in accordance with an embodiment of the present invention.

Turning now to FIG. 5, a series of simplified video frames 500 with a color sampling ratio of 2:1:0 are shown. The simplified video frames 500 have been processed according to the color decoupling process 700. At 510, the first frame in an image pipeline is shown. The frame 510 is similar to the frame 310 of FIG. 3 except that it has been decoupled, processed, and fused by the process 700 as described in connection with FIG. 4. As with frame 310, frame 510 may represent a macroblock or an entire video frame. The frame has four pixels (Y values) indicated at Y1 through Y4, and one UV color sample indicated at U1 and V1. At 520 and 530, frames similar to frame 510 are shown without UV color components, i.e., frames 520 and 530 are grayscale only frames. In this instance, frames 520 and 530 have not been selected for fusing with their respective color components. The color components corresponding to frames 520 and 530 may be discarded.

Frames 520 and 530 are followed by a series of grayscale frames as shown. At 540, a frame has been selected for fusing with its respective color components as shown. Frame 540 is followed by a series of grayscale frames. Frame 540 may be selected for fusing based on predetermined criteria or selected at predetermined intervals, e.g., every other frame, every fifth frame, every tenth frame, etc. At 550, the simplified video frames 500 are shown as they might be transmitted in a color image pipeline. In this example the Y components are transmitted first, followed by the UV color components.

As can be seen from FIG. 5, an advantage of using the process 700 is that much less color information is transmitted relative to the color information transmitted as shown in FIG. 3. Thus, for any given bandwidth, less color information can be transmitted using the techniques described herein than when conventional techniques are used. However, as the video scene changes, either by movement within the video scene or by the camera itself moving, the color components will only be synchronized with the grayscale components for fused frames. Until the next time color components are fused with the grayscale components a color shadow may exist on the display for portions of the video scene that has changed. For some applications where the video scene changes slowly, e.g., vehicular rearview or backup cameras, baby monitoring cameras, or cameras coupled to medical patients for location monitoring, color shadowing is a minor problem and systems can be designed with a smaller transmission bandwidth.

Figure 6:
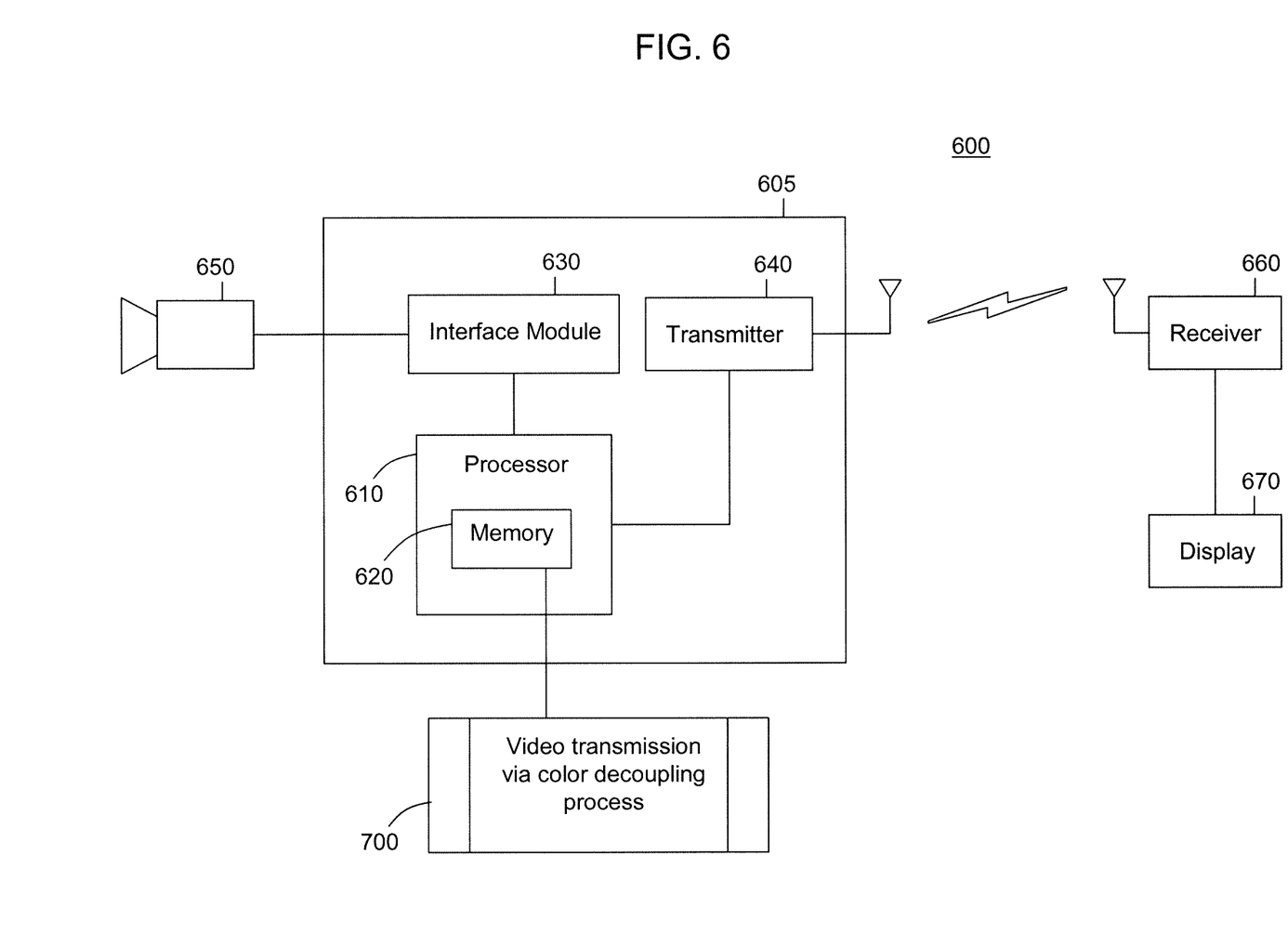
FIG. 6 is a block diagram of a system configured to perform video transmission by decoupling color components in accordance with an embodiment of the present invention.
Figure 7:
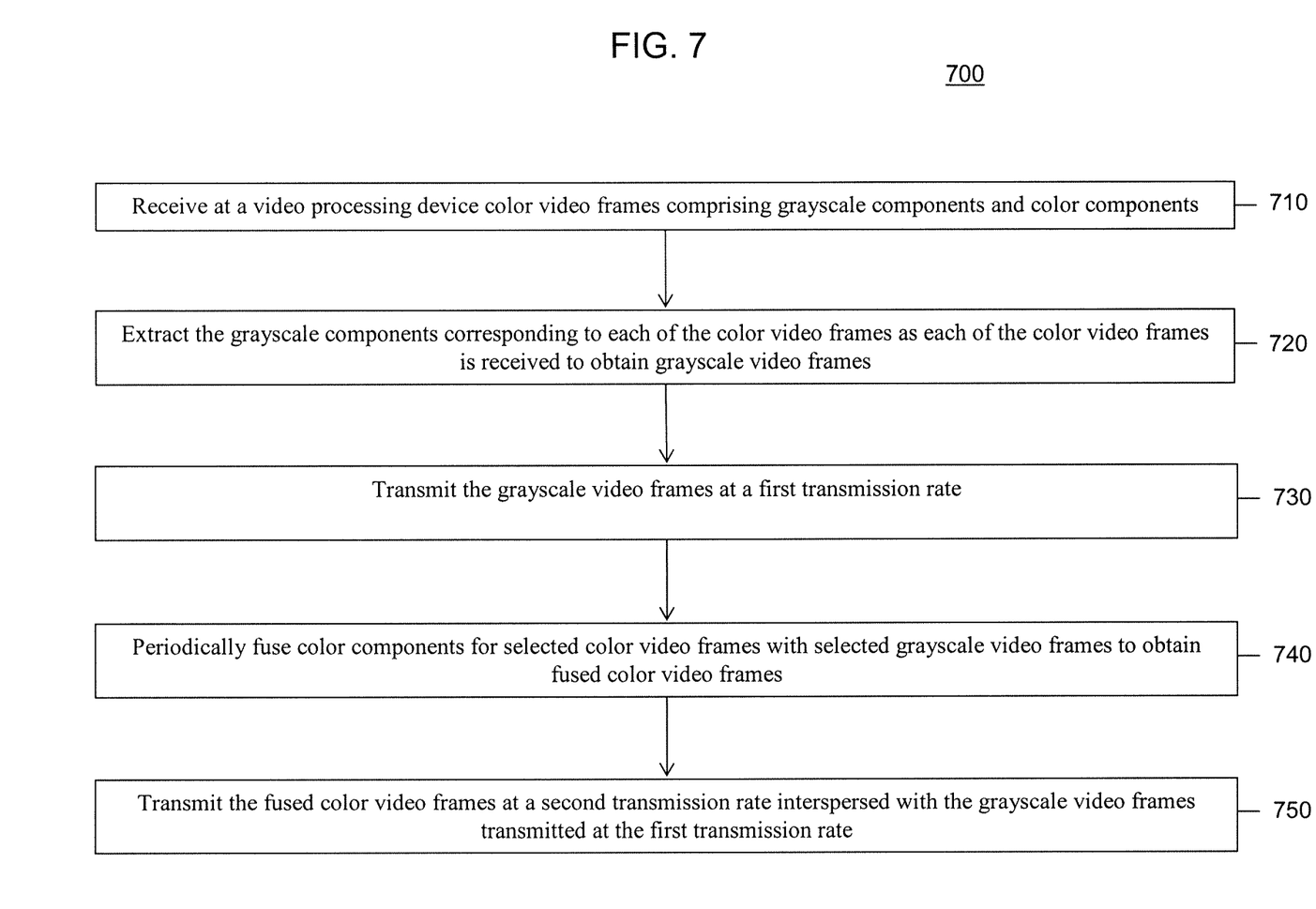
FIG. 7 is an example procedural flowchart illustrating the manner in which video is transmitted with decoupled color components in accordance with an embodiment of the present invention.

Turning now to FIG. 6, a block diagram of a system 600 which is configured to perform video transmission by color decoupling process 700 is depicted. The system 600 comprises a camera 650, a video processing device 605, and a display 670 coupled to, e.g., a wireless receiver 660. The video processing device 605 comprises a data processing device 610, an interface module 630, a memory 620, and a wireless transmitter 640. Resident in the memory 620 is software configured to execute color decoupling process module 700. The video processing device 605 and process 700 may also be implemented entirely in software and executed on available commercial off-the-shelf computing equipment.

The data processing device 610 may be a microprocessor, microcontroller, systems on a chip (SOCs), or other fixed or programmable logic. The memory 620 may be any form of random access memory (RAM) or other data storage block that stores data used for the techniques described herein. The memory 620 may be separate or part of the processor 610. Instructions for performing the process 700 may be stored in the memory 620 for execution by the processor 610. The interface unit 630 enables communication between the video processing device 605 and the camera 650, and may provide an interface to other network elements (not shown) that may be included in the system 600.

The functions of the processor 610 may be implemented by a processor readable tangible medium encoded with instructions or by logic encoded in one or more tangible media (e.g., embedded logic such as an application specific integrated circuit (ASIC), digital signal processor (DSP) instructions, software that is executed by a processor, etc.), wherein the memory 620 stores data used for the computations or functions described herein (and/or to store software or processor instructions that are executed to carry out the computations or functions described herein). Thus, the process 700 may be implemented with fixed logic or programmable logic (e.g., software or computer instructions executed by a processor or field programmable gate array (FPGA)).

Color video frames may be streamed from the camera 650 to the video processing device 605. The video processing device 605 processes the color video frames to produce grayscale frames and fused video frames. The grayscale frames and fused video frames may be transmitted by the wireless transmitter 640 to the wireless receiver 660. The grayscale frames and fused video frames may then be displayed on the display 670. When the video is transmitted, packet loss or data corruption may occur resulting in missing information for a decoded video frame. Lost video information may be recovered by copying the affected areas from a previously decoded video frame or the lost video information may be retransmitted by the wireless transmitter 640. It is to be understood that the wireless receiver 660 and the display 670 may contain controllers or processors, and storage to perform processing on the received grayscale frames and fused video frames for presentation on the display 670.

Referring to FIG. 7, an example procedural flowchart illustrating the manner in which color video frames are processed according to process 700 will be described. At 710, at a video processing device, e.g., video processing device 605, color video frames are received that have grayscale components and color components. At 720, the grayscale components corresponding to each of the color video frames are extracted or separated as each of the color video frames is received to obtain grayscale video frames. Once separated, the grayscale video frames may undergo additional processing as mentioned in connection with FIG. 4 and described hereinafter. In some implementations the video frames will be received from a YUV or HSI camera which already transmits separate grayscale and color components. In other implementations video will be received from an RGB source and may have to be converted to YUV or HSI.

RGB to YUV conversion can be performed using the following equations:

$$Y=0.299R+0.587G+0.114B$$

$$U=0.492(B-Y)$$

$$V=0.877(R-Y) \quad (1)$$

The coefficients in equations (1) are examples for common implementations and may vary depending on the equipment used and design constraints.

RGB to HSI conversion can be performed using the following equations:

$$I=(R+G+B)/3$$

$$S=1-(3/(R+G+B))\times a, \text{ where } a=\min(R,G,B)$$

$$H=\cos^{-1}((0.5\times((R-G)+(R-B)))/((R-G)^2+(R-B)\times(G-B))^{1/2}) \quad (2)$$

If (B/I)>(G/I), then H=360−H, H in degrees
H can then be normalized from zero to one, i.e., H=H/360, or normalized according to the number of bits used in the digital representation of H. S and I can also be normalized according to the number of bits used in the digital representation.

Referring back to FIG. 7, at 730, the grayscale video frames are transmitted at a first transmission rate. Since the brain relies more heavily on the grayscale components, the grayscale video frames are transmitted continuously. The frames should be transmitted at a frame rate greater than 10 Hertz to avoid the perception of flicker on the display. The transmission rate need not be the same as the rate the color video frames are supplied, e.g., by the camera 650. By way of example, the camera 650 may supply color video frames at 30 Hz or 60 Hz, while the video processing device, e.g., video processing device 605, transmits the grayscale frames at 15, 24, or 30 Hz.

At 740, color components for selected color video frames are periodically fused with selected grayscale video frames to obtain fused color video frames. At 750, the fused color video frames are transmitted at a second transmission rate interspersed with the grayscale video frames transmitted at the first transmission rate. In one example, the color components are periodically added to the outgoing video stream. The rate at which the color components are fused may be varied and based on predetermined criteria or the rate may be fixed, e.g., every other frame, every fifth frame, every tenth frame, etc. Predetermined criteria may include motion compensation exceeding a threshold, a change in one or more grayscale components between a color video frame and a next color video frame exceeding a threshold, and/or a rate of change in one or more grayscale components between the color video frame and the next color video frame exceeding a threshold. For example, if a motion compensation vector for one or more macroblocks, or a frame exceeds a threshold, then color may be added for that macroblock at a higher rate, or to the frame, in order to reduce color shadowing.

In other embodiments, the grayscale components may undergo further processing using image processing techniques. Image processing may include using inter-frame redundancy techniques, reducing the grayscale resolution, and/or reducing the spatial resolution. Inter-frame redundancy techniques may include differential frame processing, edge map detection, and run length coding. To reduce the grayscale resolution, bit-plane coding, pulse code modulation, and image quantization may be employed. The spatial resolution may be reduced by computing an image pyramid and/or computing a wavelet transform. In addition, embodiments described herein may undergo other image or video processing known to those skilled in the art.

Techniques have been described herein to receive at a video processing device color video frames comprising grayscale components and color components. The grayscale components corresponding to each of the color video frames are extracted as each of the color video frames is received to obtain grayscale video frames. The grayscale video frames are transmitted at a first transmission rate. Color components for selected color video frames are periodically fused with selected grayscale video frames to obtain fused color video frames, and the fused color video frames are transmitted at a second transmission rate interspersed with the grayscale video frames transmitted at the first transmission rate.

Having described preferred embodiments of a new and improved video transmission by decoupling color components, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A method for transmitting video, the method comprising:
   receiving at a video processing device color video frames comprising grayscale components and color components;
   extracting the grayscale components corresponding to each of the color video frames as each of the color video frames is received to obtain grayscale video frames;
   transmitting the grayscale video frames at a first transmission rate;
   periodically fusing color components for selected color video frames with selected grayscale video frames to obtain fused color video frames; and
   transmitting the fused color video frames at a second transmission rate interspersed with the grayscale video frames transmitted at the first transmission rate.

2. The method of claim 1, wherein the first and second video transmission rates are fixed or varied based on predetermined criteria.

3. The method of claim 2, wherein the predetermined criteria include motion compensation exceeding a threshold, a change in one or more grayscale components between a color video frame and a next color video frame exceeding a threshold, and/or a rate of change in one or more grayscale components between the color video frame and the next color video frame exceeding a threshold.

4. The method of claim 1, further comprising processing the grayscale components using inter-frame redundancy techniques.

5. The method of claim 4, wherein the inter-frame redundancy techniques comprise differential frame processing, edge map detection, and/or run length coding.

6. The method of claim 1, further comprising processing the grayscale components to reduce grayscale resolution.

7. The method of claim 6, wherein reducing the grayscale resolution comprises bit-plane coding, pulse code modulation, and/or image quantization.

8. The method of claim 1, further comprising processing the grayscale components to reduce spatial resolution.

9. The method of claim 8, wherein reducing the spatial resolution comprises computing an image pyramid and/or computing a wavelet transform.

10. The method of claim 1, wherein the color video frames are received from a camera.

11. The method of claim 1, wherein transmitting the grayscale video frames and transmitting the fused color video frames comprises wirelessly transmitting, and further comprising:
    receiving the grayscale video frames and the fused color video frames at a wireless receiver coupled to a display; and
    displaying the grayscale video frames and the fused color video frames on the display.

12. An apparatus comprising:
    an interface module configured to receive color video frames comprising grayscale components and color components;
    a camera, wherein the interface module is configured to receive the color video frames from the camera;
    a wireless transmitter;
    a processor configured to:
       extract the grayscale components corresponding to each of the color video frames as each of the color video frames is received to obtain grayscale video frames;
       cause the transmitter to transmit the grayscale video frames at a first transmission rate;
       periodically fuse color components for selected color video frames with selected grayscale video frames to obtain fused color video frames; and
       cause the transmitter to transmit the fused color video frames at a second transmission rate interspersed with the grayscale video frames transmitted at the first transmission rate;
    a wireless receiver configured to receive the grayscale video frames and the fused color video frames; and
    a display coupled to the wireless receiver configured to display the grayscale video frames and the fused color video frames.

13. The apparatus of claim 12, wherein the processor is configured to vary the first and second video transmission rates based on predetermined criteria.

14. The apparatus of claim 13, wherein the processor is configured to vary the video transmission rates based on predetermined criteria including motion compensation exceeding a threshold, a change in one or more grayscale components between a color video frame and a next color video frame exceeding a threshold, and/or a rate of change in one or more grayscale components between the color video frame and the next color video frame exceeding a threshold.

15. The apparatus of claim 12, wherein the processor is further configured to process the grayscale components using inter-frame redundancy techniques.

16. The apparatus of claim 12, wherein the processor is further configured to process the grayscale components to reduce grayscale resolution.

17. The apparatus of claim 12, wherein the processor is further configured to process the grayscale components to reduce spatial resolution.

18. A non-transitory processor readable tangible medium encoded with instructions that, when executed by a processor, cause the processor to:
    receive color video frames comprising grayscale components and color components via an interface module;
    extract the grayscale components corresponding to each of the color video frames as each of the color video frames is received to obtain grayscale video frames;

transmit the grayscale video frames at a first transmission rate;
periodically fuse color components for selected color video frames with selected grayscale video frames to obtain fused color video frames; and
transmit the fused color video frames at a second transmission rate interspersed with the grayscale video frames transmitted at the first transmission rate.

\* \* \* \* \*